United States Patent
Takagi

(10) Patent No.: US 10,178,312 B2
(45) Date of Patent: Jan. 8, 2019

(54) IMAGE PROCESSING APPARATUS AND IMAGE PROCESSING METHOD TO POSITION IMAGES TO POSITION IMAGES

(71) Applicant: CANON KABUSHIKI KAISHA, Tokyo (JP)

(72) Inventor: Shin Takagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 14/932,810

(22) Filed: Nov. 4, 2015

(65) Prior Publication Data
US 2016/0162754 A1 Jun. 9, 2016

(30) Foreign Application Priority Data

Dec. 3, 2014 (JP) ................................ 2014-245237

(51) Int. Cl.
*G06K 9/62* (2006.01)
*H04N 5/232* (2006.01)
(Continued)

(52) U.S. Cl.
CPC ..... *H04N 5/23248* (2013.01); *G06K 9/00744* (2013.01); *G06K 9/32* (2013.01); *G06T 3/4038* (2013.01); *G06T 7/337* (2017.01); *H04N 5/23232* (2013.01); *H04N 5/23254* (2013.01); *H04N 5/23258* (2013.01); *H04N 5/23267* (2013.01)

(58) Field of Classification Search
CPC ........... H04N 5/23248; H04N 5/23254; H04N 5/23258; H04N 5/23267; H04N 5/23232; G06T 7/337; G06T 3/4038; G06K 9/00744; G06K 9/32

USPC .................................................. 382/224–228
See application file for complete search history.

(56) References Cited

U.S. PATENT DOCUMENTS 6,249,612 B1* 6/2001 Ogura .................... H04N 5/145
348/407.1
2007/0177859 A1* 8/2007 Ito .......................... G11B 19/04
396/55
(Continued)

FOREIGN PATENT DOCUMENTS

JP 2006-054518 A 2/2006
JP 2006-180429 A 7/2006
(Continued)

*Primary Examiner* — Andrew Moyer
(74) *Attorney, Agent, or Firm* — Canon U.S.A., Inc. IP Division

(57) ABSTRACT

An image processing apparatus for synthesizing continuously captured images includes a positioning unit configured to position images to be synthesized by using a motion vector indicating a positional deviation of the images between the images, and a synthesis unit configured to synthesize the images positioned by the positioning unit. The image processing apparatus further includes a group classification unit configured to classify the images into groups based on an order of imaging, and a setting unit configured to set a reference image in each group. The positioning unit includes a first positioning unit configured to position the images within the groups with respect to the respective reference images, and a second positioning unit configured to position the reference images between the groups.

10 Claims, 7 Drawing Sheets

(51) Int. Cl.
*G06T 3/40* (2006.01)
*G06K 9/00* (2006.01)
*G06K 9/32* (2006.01)
*G06T 7/33* (2017.01)

(56) References Cited

U.S. PATENT DOCUMENTS

| | | | |
|---|---|---|---|
| 2012/0051662 A1* | 3/2012 | Naito | G06T 5/50 |
| | | | 382/275 |
| 2012/0236164 A1* | 9/2012 | Nakano | H04N 5/23219 |
| | | | 348/208.1 |
| 2013/0155264 A1* | 6/2013 | Zhou | H04N 5/23267 |
| | | | 348/208.6 |
| 2015/0147002 A1* | 5/2015 | Hautvast | G06T 7/38 |
| | | | 382/294 |

FOREIGN PATENT DOCUMENTS

| | | |
|---|---|---|
| JP | 2008219124 A | 9/2008 |
| JP | 2014039222 A | 2/2014 |

\* cited by examiner

FIG. 4
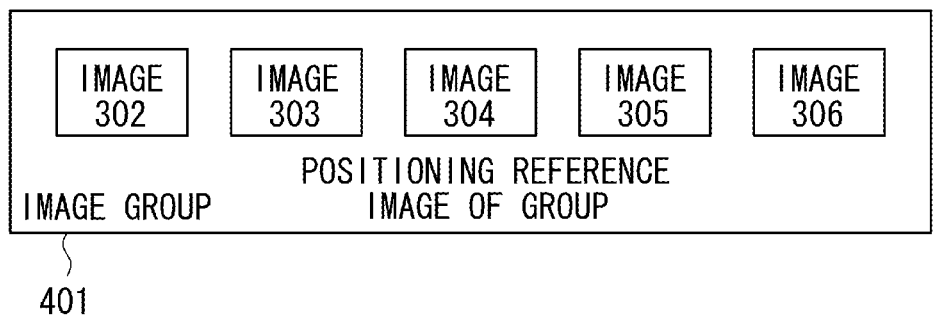
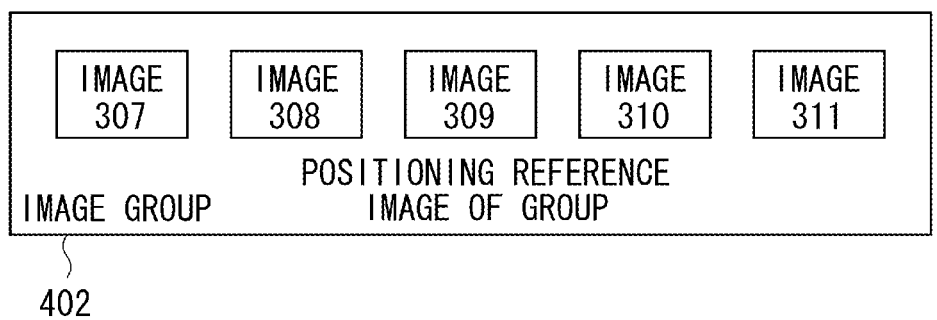
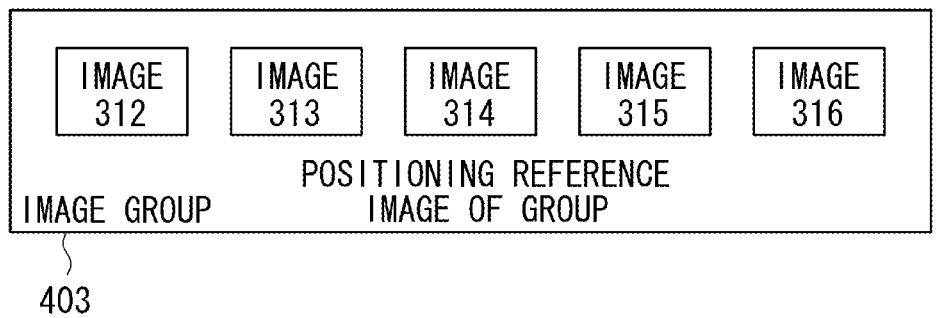

IMAGE PROCESSING APPARATUS AND IMAGE PROCESSING METHOD TO POSITION IMAGES TO POSITION IMAGES

BACKGROUND OF THE INVENTION

Field of the Invention

The present invention relates to image processing for positioning and synthesizing a plurality of images obtained by continuous imaging.

Description of the Related Art

Methods for reducing time required for image synthesis processing by switching a detection range for detecting a motion vector between images according to an imaging condition or grouping a plurality of captured images have conventionally been discussed.

For example, Japanese Patent Application Laid-Open No. 2006-054518 discusses a method for reducing time required for camera shake correction of captured images by changing a motion vector detection range according to an exposure time interval between the images.

Japanese Patent Application Laid-Open No. 2006-180429 discusses a method for grouping a plurality of captured images for each direction of a positional deviation and performing positioning group by group. The method thereby implements camera shake correction using an inverse conversion filter only in directions in which the camera shake correction is needed, while performing noise reduction in directions free of camera shake.

In the conventional technique discussed in the foregoing Japanese Patent Application Laid-Open No. 2006-054518, the detection range of a motion vector is changed according to the exposure time interval from the previous image, thereby reducing processing time. However, the technique does not take account of situations where the exposure time interval with respect to a positioning reference image gradually increases.

The conventional technique discussed in the foregoing Japanese Patent Application Laid-Open No. 2006-180429 groups a plurality of images and performs camera shake correction only in necessary directions. However, the technique does not take account of a reduction in the time needed for the camera shake correction.

SUMMARY OF THE INVENTION

According to an aspect of the present invention, an image processing apparatus for synthesizing images obtained by imaging includes a classification unit configured to classify the images into a plurality of groups based on an order of the imaging, a setting unit configured to set a reference image in each of the groups, a positioning unit configured to position the images using a motion vector indicating a positional deviation between the images, wherein the positioning unit includes a first positioning unit configured to position the images within the groups with reference to the respective reference images and a second positioning unit configured to position the reference images between the groups, and a synthesis unit configured to synthesize the images positioned by the positioning unit.

Further features of the present invention will become apparent from the following description of exemplary embodiments with reference to the attached drawings.

BRIEF DESCRIPTION OF THE DRAWINGS

FIG. 4 is a diagram illustrating group classification of the captured images according to the exemplary embodiment of the present invention.

DESCRIPTION OF THE EMBODIMENTS

An exemplary embodiment of the present invention will be described in detail below with reference to the accompanying drawings. The present exemplary embodiment is described by using an electronic camera as an example of an image processing apparatus.

Figure 1:
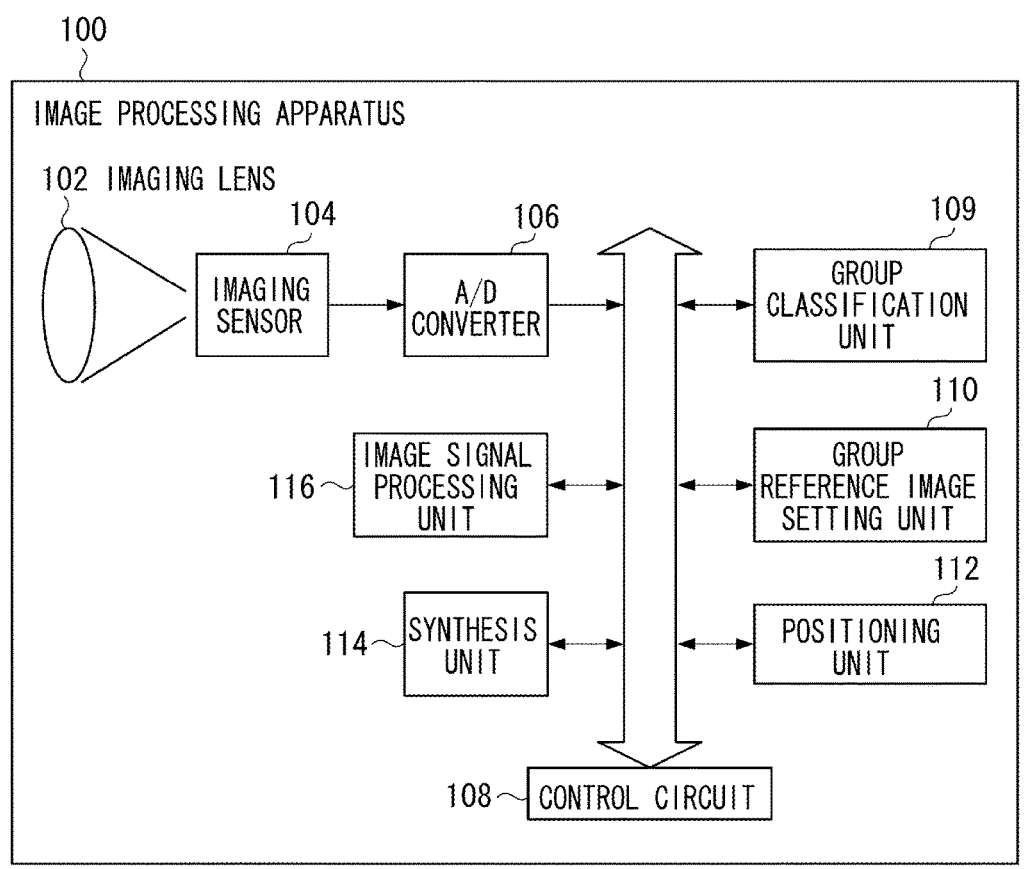
FIG. 1 is a block diagram illustrating a configuration of an information processing apparatus according to an exemplary embodiment of the present invention.
Figure 2:
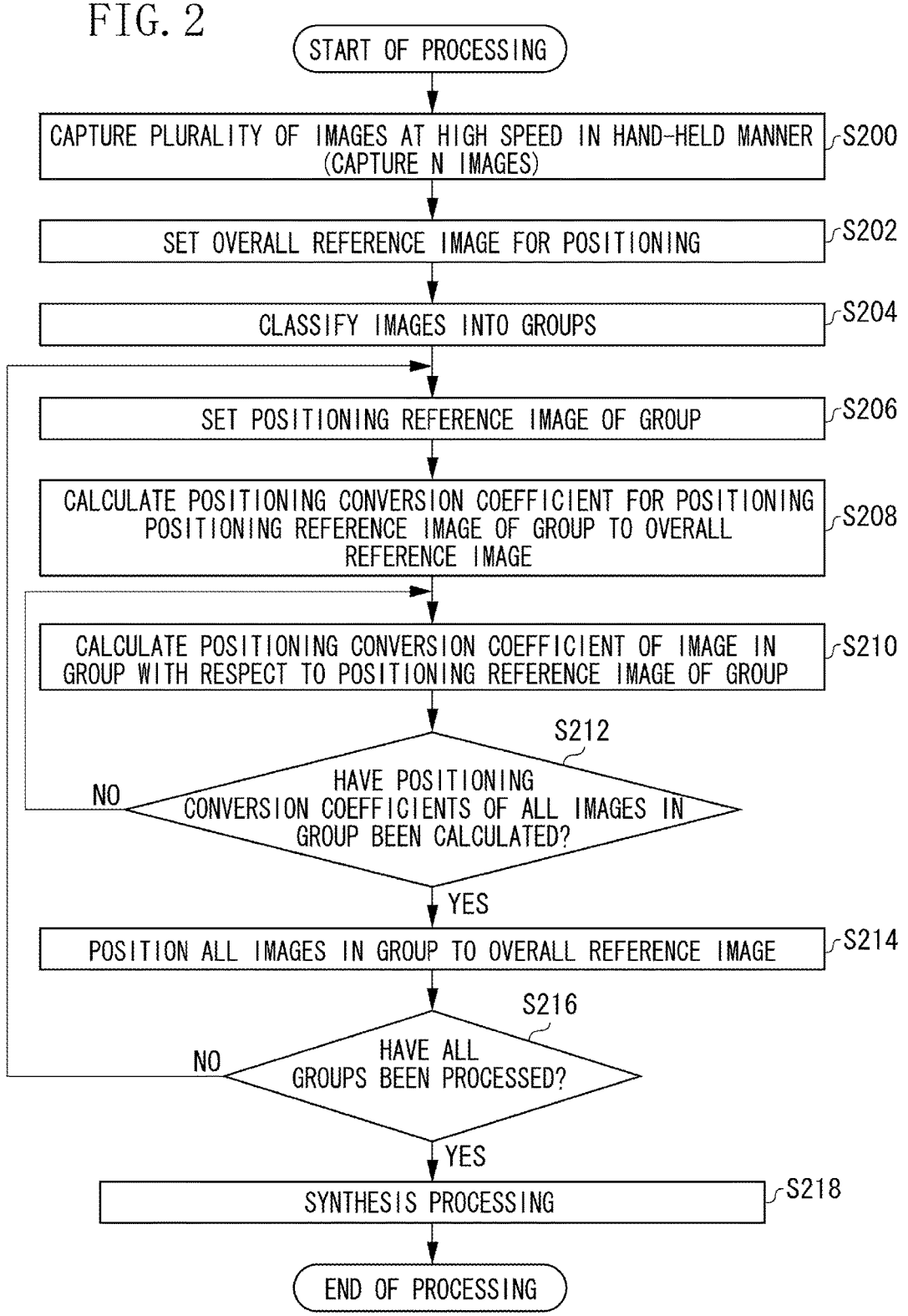
FIG. 2 is a flowchart illustrating image synthesis processing according to the exemplary embodiment of the present invention.

FIG. 1 is a block diagram illustrating a configuration of the electronic camera according to the present exemplary embodiment. FIG. 2 is a flowchart illustrating a flow of image synthesis processing performed by the electronic camera according to the present exemplary embodiment.

The image synthesis processing will be described with reference to FIGS. 1 and 2.

The configuration of the electronic camera serving as an image processing apparatus will initially be described with reference to FIG. 1.

An imaging lens 102 optically forms an image of an object on an imaging sensor 104. The imaging sensor 104 converts the formed image into an analog electrical signal. The imaging sensor 104 includes a plurality of color filters. An analog-to-digital (A/D) converter 106 converts the analog signal output from the imaging sensor 104 into a digital signal.

A control circuit 108 controls a flow of data among the A/D converter 106, a group classification unit 109, a group reference image setting unit 110, a positioning unit 112, a synthesis unit 114, and an image signal processing unit 116.

The group classification unit 109 performs processing for classifying a plurality of images obtained by continuous imaging into several groups.

The group reference image setting unit 110 sets a reference image for positioning images in a group for each of the groups classified by the group classification unit 109.

Figure 6:
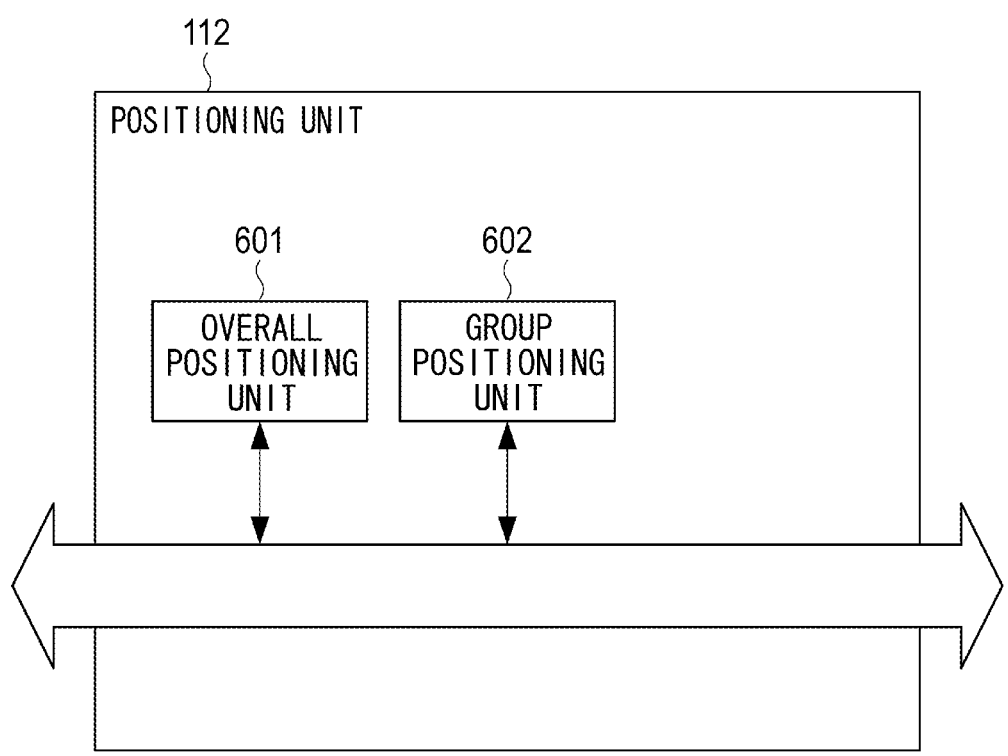
FIG. 6 is a block diagram illustrating a configuration of a positioning unit according to the exemplary embodiment of the present invention.

The positioning unit 112 performs processing for correcting a positional deviation between two images to be synthesized among a plurality of captured images, thereby positioning the images to each other. The positioning unit 112 includes an overall positioning unit 601 and a group positioning unit 602 (see FIG. 6). The overall positioning unit 601 performs positioning between an overall reference image to be described below and the reference image set for each of the groups. The group positioning unit 602 performs positioning a plurality of times with reference to the reference image in each group.

The overall positioning unit 601 and the group positioning unit 602 differ only in a search range of a motion vector.

Only either one may be included in the positioning unit 112 and configured to switch a setting of the search range of a motion vector.

The synthesis unit 114 synthesizes the images positioned by the positioning unit 112.

The image signal processing unit 116 performs image signal processing such as synchronization processing, white balance processing, γ processing, and noise reduction (NR) processing on the captured images to develop image data.

Next, the image synthesis processing performed by the image processing apparatus will be described with reference to FIG. 2.

Figure 3:
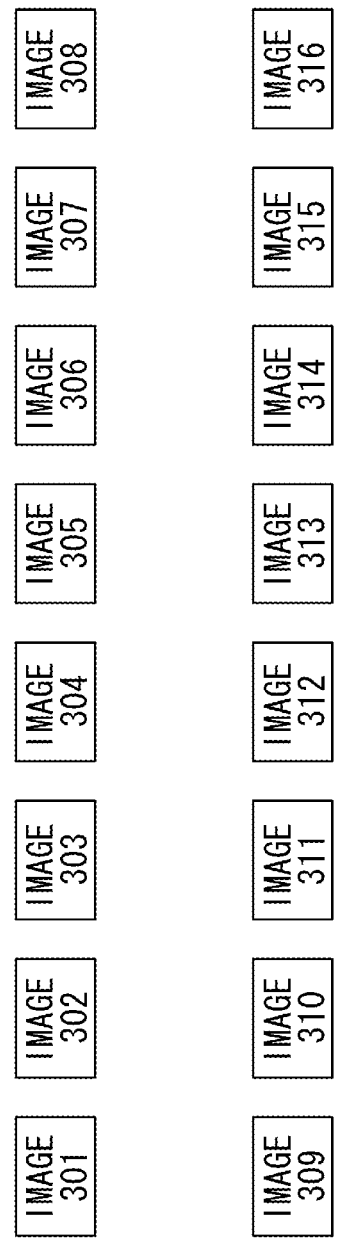
FIG. 3 is a diagram illustrating captured images according to the exemplary embodiment of the present invention.

In step S200, the user initially captures a plurality of images (N images) at high speed, while holding the image processing apparatus 100 in hand. In the present exemplary embodiment, N is described to be 16. However, the number of images is not limited to 16 in particular. FIG. 3 illustrates the 16 captured images.

In step S202, the image processing apparatus 100 sets one overall reference image, which is an image serving as overall reference for positioning, from among the plurality of captured images. In the present exemplary embodiment, an image 301 that is the first captured image is set as the overall reference image. However, an arbitrary image may be selected from among the plurality of captured images.

In step S204, the group classification unit 109 classifies the plurality of captured images into several groups. In the present exemplary embodiment, as illustrated in FIG. 4, the group classification unit 109 classifies the 15 images other than the overall reference image into three groups of five images in a captured order. An image group 401 includes five images 302 to 306 as the first group. An image group 402 includes five images 307 to 311 as the second group. An image group 403 includes images 312 to 316 as the third group.

Instead of the method for classifying a predetermined number of images into each group in the captured order as described above, the following group classification methods may be used. If an amount of positional deviation during an imaging period can be obtained as gyro information from a gyro device (gyro information acquisition unit) attached to or outside the image processing apparatus 100, images having an amount of positional deviation within a predetermined range may be classified into one group. Further, images may be classified into a group at predetermined time intervals.

Next, the image processing apparatus 100 performs positioning processing in each image group. In step S206, the group reference image setting unit 110 initially selects the image group 401 as an image group, and sets a positioning reference image of the group. In the present exemplary embodiment, the group reference image setting unit 110 selects an image positioned in the middle of the captured images in the image group 410 in the captured order as the positioning reference image of the group. Accordingly, the group reference image setting unit 110 selects the image 304 as the positioning reference image of the image group 401.

Methods for selecting a positioning reference image of the group will be described. In one method, an image captured closest to the middle in time in the group may be selected as the positioning reference image of the group. In another method, if the amount of positional deviation during an imaging period can be obtained as gyro information from an external gyro apparatus (gyro information acquisition unit), an image having an amount of positional deviation closest to an average of the obtained amounts of positional deviation may be selected as the positioning reference image of the group.

In step S208, the overall positioning unit 601 calculates a positioning conversion coefficient for positioning the positioning reference image of the group to the overall reference image. For the image group 401, the overall positioning unit 601 calculates a positioning conversion coefficient between the images 304 and 301.

A method for calculating a positioning conversion coefficient will be described below.

To calculate a positioning conversion coefficient, the overall positioning unit 601 initially calculates a motion vector between images. There are various methods for calculating a motion vector. In the present exemplary embodiment, template matching between images is used. A method for template matching will be described with reference to FIG. 7.

Figure 7:
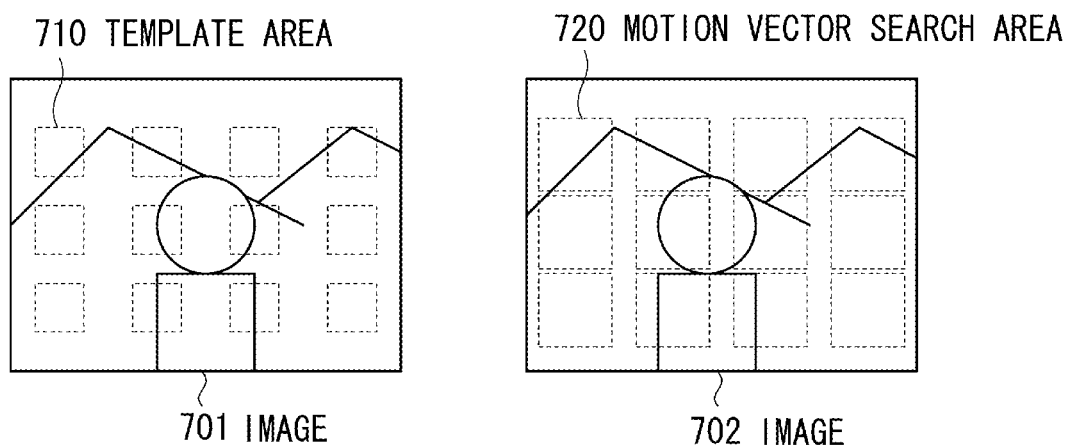
FIG. 7 is a diagram illustrating calculation of a motion vector according to the exemplary embodiment of the present invention.

As illustrated in FIG. 7, the overall positioning unit 601 sets a predetermined position of an image 701 (i.e., reference image) as a template area 710. Next, the overall positioning unit 601 sets a motion vector search area 720 corresponding to the template area 710 in an image 702 (i.e., image to be positioned). In step S208, the image 701 (i.e., reference image) corresponds to the image 301. The image 702 (i.e., image to be positioned) corresponds to the image 304.

The motion vector search area 720 is set to be larger than the template area 710 in consideration of the amount of positional deviation of the corresponding template area 710. The size of the motion vector search area 720 is preferably determined based on the amount of positional deviation estimated between the images 701 and 702. More specifically, the greater the estimated amount of positional deviation, the larger the motion vector search area 720. The smaller the estimated amount of positional deviation, the narrower the motion vector search area 720.

The overall positioning unit 601 detects a motion vector which indicates the amount of local positional deviation of each of the images 701 and 702 between the template area 710 and the motion vector search area 720. In template matching, the overall positioning unit 601 scans the motion vector search area 720 with the template area 710 to detect a scanning position where a degree of similarity is highest as a motion vector. The degree of similarity in the template matching can be evaluated using a sum of absolute difference (SAD). The position in which the sum of absolute difference of pixel values becomes smallest within the template area 710 is assumed to be the motion vector of the template area 710.

The image 701 (i.e., reference image) includes not only the template area 710 but a total of 12 template areas surrounded by dotted lines. Similarly, the image 702 (i.e., image to be positioned) includes a total of 12 motion vector search areas.

Figure 5:
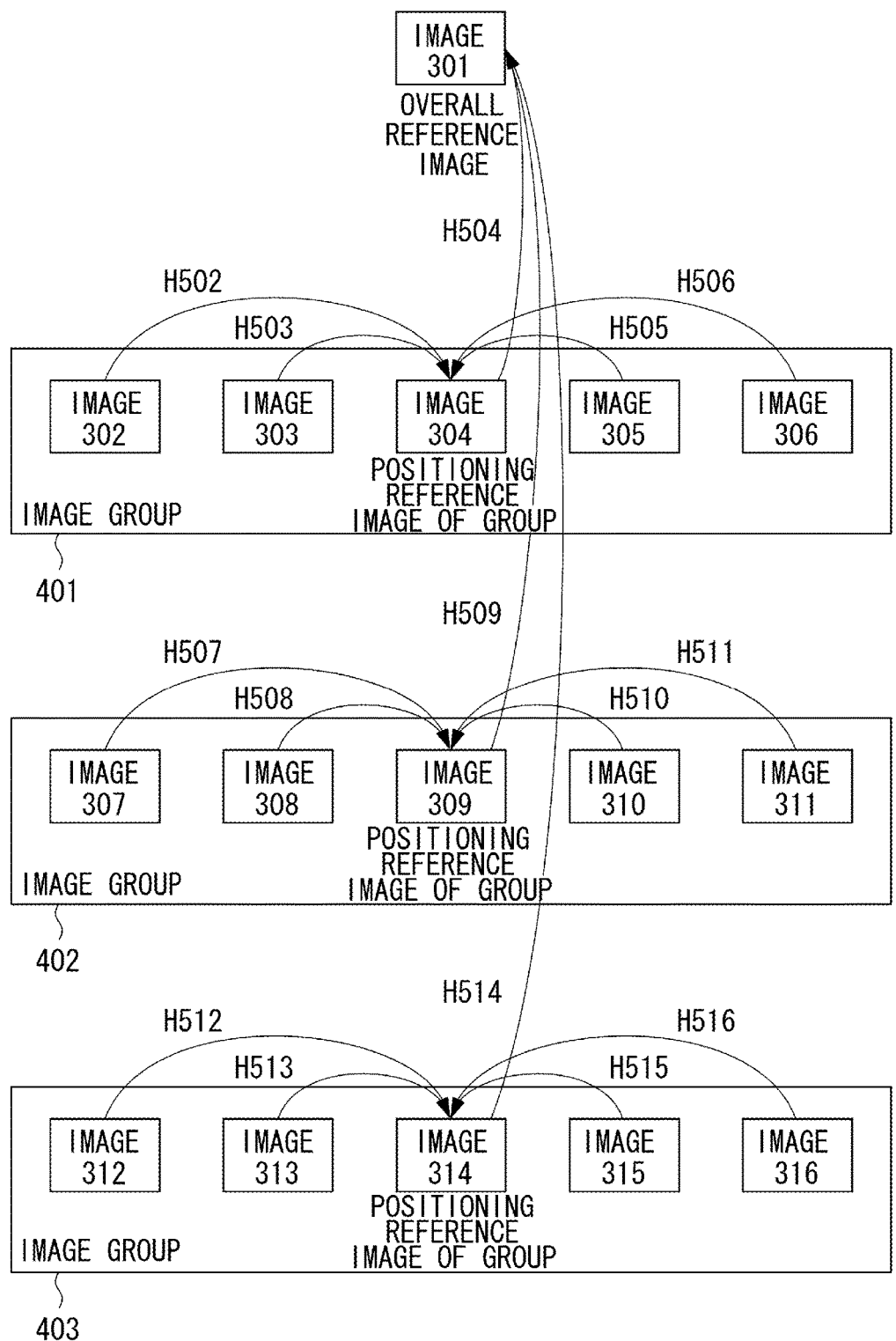
FIG. 5 is a diagram illustrating positioning of the captured images according to the exemplary embodiment of the present invention.

The overall positioning unit 601 calculates a positioning conversion coefficient from the motion vector calculated for each of the template areas by the least squares method. The calculated positioning conversion coefficient is represented by H504, as illustrated in FIG. 5.

In step S210, the group positioning unit 602 calculates a positioning conversion coefficient of each image in the group with respect to the positioning reference image set for each group. In this example, the group positioning unit 602 initially calculates a positioning conversion coefficient for positioning the image 302 to the image 304.

The calculation method may be similar to the method for calculating the positioning conversion coefficient for positioning the positioning reference image of the group to the overall reference image. The calculation method differs from the method used to position the positioning reference image of the group to the overall reference image only in the search range of a motion vector, which will be described below in detail. In step S210, the image 701 (i.e., reference image) of FIG. 7 corresponds to the image 304. The image 702 (i.e., image to be positioned) of FIG. 7 corresponds to the image 302.

As described for the method for calculating a positioning conversion coefficient for positioning the positioning reference image of the group to the overall reference image, the size of the motion vector search area 720 is preferably determined based on the amount of positional deviation estimated between the images 701 and 702. As compared to the amount of positional deviation between the image 304 (i.e., positioning reference image of the group) and the image 301 (i.e., overall reference image), the amount of positional deviation between the image 304 (i.e., positioning reference image of the group) and another image 302 in the group is relatively small because the time interval between the captured time of the image 304 and the captured time of the image 302 is shorter than the imaging interval between the overall reference image and the positioning reference image of the group. The size of the motion vector search area 720 can thus be determined to be narrower. Specifically, the group positioning unit 602 determines the motion vector search area 720 based on the following equation:

[Motion vector search area with respect to the positioning reference image of the group]=[Motion vector search area with respect to the overall reference image]×[Imaging interval between the images of the group]÷[Imaging interval between the overall reference image and the positioning reference image of the group]    (Equation 1)

By narrowing the search range of a motion vector according to the ratio of the imaging intervals as described above, the processing time required for positioning and image synthesis can be reduced. The positioning conversion coefficient calculated from the motion vectors calculated based on the positional deviation of another image 302 in the group with respect to the positioning reference image 304 of the group will be denoted by H502 (FIG. 5).

In step S212, the group positioning unit 602 similarly calculates positioning conversion coefficients H503, H505, and H506 of the images 303, 305, and 306, respectively, in the image group 401 and performs positioning.

In step S214, the group positioning unit 602 calculates positioning conversion coefficients of all the images 302 to 306 in the image group 401 with respect to the overall reference image 301 and performs positioning. As an example, a method for positioning the image 302 to the image 301 (i.e., overall reference image) will be described. The group positioning unit 602 positions the image 302 to the image 301 using a positioning conversion coefficient obtained by multiplying the positioning conversion coefficient H502 by the positioning conversion coefficient H504. The group positioning unit 602 similarly calculates positioning conversion coefficients of the images 303, 305, and 306 with respect to the image 301 (i.e., overall reference image), and performs positioning. The group positioning unit 602 positions the image 304 to the image 301 using the positioning conversion coefficient H504 calculated in step S206.

The reference image set for each group (images 304, 309, and 314) can be positioned by using only the positioning conversion coefficient for positioning to the overall reference image 301.

In step S216, the group positioning unit 602 determines whether all the groups have been processed. In the state where the image group 401 has been processed, the image groups 402 and 403 are yet to be processed (NO in step S216). In such a case, the group positioning unit 602 repeats the processing of steps S206 to S214 on the image groups 402 and 403 in a similar manner to the processing performed on the image group 401.

If all the images have been positioned to the overall reference image (YES in step S216), the processing proceeds to step S218. Then, in step S218, the synthesis unit 114 performs synthesis processing on the plurality of positioned images. In the present exemplary embodiment, the synthesis unit 114 synthesizes the images 301 to 316 captured in the same imaging condition by weighted addition, whereby an image having a signal-to-noise (S/N) ratio higher than that of a single image can be generated.

Calculating the plurality of positioning conversion coefficients as described above enables highly accurate positioning processing with respect to the overall reference image for positioning while reducing the time needed for the positioning processing.

The processing illustrated in the flowchart according to the exemplary embodiment of the present invention may be implemented by the image processing apparatus reading a computer program for implementing the functions of the processing from a memory, and a central processing unit (CPU) in the image processing apparatus executing the computer program.

While the exemplary embodiment of the present invention has been described above, the present invention is not limited to such an exemplary embodiment, and various modifications and changes may be made without departing from the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-245237, filed Dec. 3, 2014, which is hereby incorporated by reference herein in its entirety.

What is claimed is:

1. An image processing apparatus for positioning images obtained by imaging to an overall reference image included in the images, the image processing apparatus comprising:
a memory that stores a program of instructions; and
a central processing unit that executes the program of instructions to cause the image processing apparatus to perform processing of:
classifying the images, except the overall reference image, into a plurality of groups based on an order of the imaging without duplicative classification into the group;
setting a group reference image in each of the groups; and
positioning the images using a motion vector indicating a positional deviation between the images,
wherein the positioning includes:

calculating a first conversion coefficient used to position another image included in the same group as that of the group reference image to the group reference image, calculating a second conversion coefficient used to position the group reference image to the overall reference image, and positioning the images, except the overall reference image, to the overall reference image using a conversion coefficient calculated by multiplying the first conversion coefficient by the second conversion coefficient.

2. The image processing apparatus according to claim 1, wherein the central processing unit executes the program of instructions to cause the image processing apparatus to perform processing of synthesizing the images positioned by the positioning.

3. The image processing apparatus according to claim 2, wherein the synthesizing is performed after the positioning is completed on all the images.

4. The image processing apparatus according to claim 1, wherein the positioning includes a first positioning and a second positioning, and wherein the first positioning detects a motion vector using a search range narrower than a search range of a motion vector used by the second positioning unit to detect a motion vector between the images.

5. The image processing apparatus according to claim 4, wherein the search range used by the first positioning to detect a motion vector is determined with reference to the search range used by the second positioning to detect a motion vector, using a ratio of an imaging interval between the reference images and an imaging interval between the images in the groups.

6. The image processing apparatus according to claim 1, wherein the classifying arranges the images in the order of the imaging and classify the images into groups by a predetermined number of images for each of the groups.

7. The image processing apparatus according to claim 1, further comprising a gyro device configured to output gyro information indicating motion of the image processing apparatus, wherein classifying classifies images in which the motion of the image processing apparatus falls within a predetermined range into one group.

8. The image processing apparatus according to claim 1, wherein the setting sets a central image in a captured order among the images included in the group as the reference image of the group.

9. The image processing apparatus according to claim 1, further comprising a gyro device configured to output gyro information indicating motion of the image processing apparatus, wherein the setting sets an image closest to an average of the motion of the image processing apparatus as the reference image based on the gyro information.

10. A method for an image processing apparatus for positioning images obtained by imaging to an overall reference image included in the images, the method apparatus comprising:

classifying the images, except the overall reference image, into a plurality of groups based on an order of the imaging without duplicative classification into the group;

setting a group reference image in each of the groups; and positioning the images using a motion vector indicating a positional deviation between the images, wherein positioning includes:

calculating a first conversion coefficient used to position another image included in the same group as that of the group reference image to the group reference image, calculating a second conversion coefficient used to position the group reference image to the overall reference image, and positioning the images, except the overall reference image, to the overall reference image using a conversion coefficient calculated by multiplying the first conversion coefficient by the second conversion coefficient.

* * * * *